Patented Nov. 13, 1923.

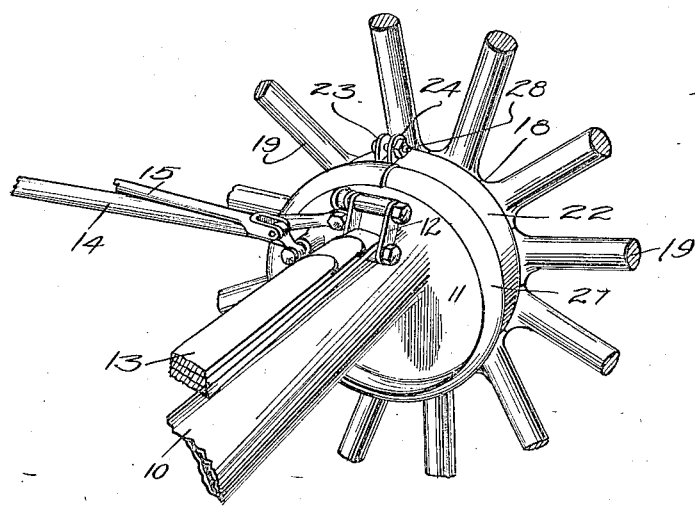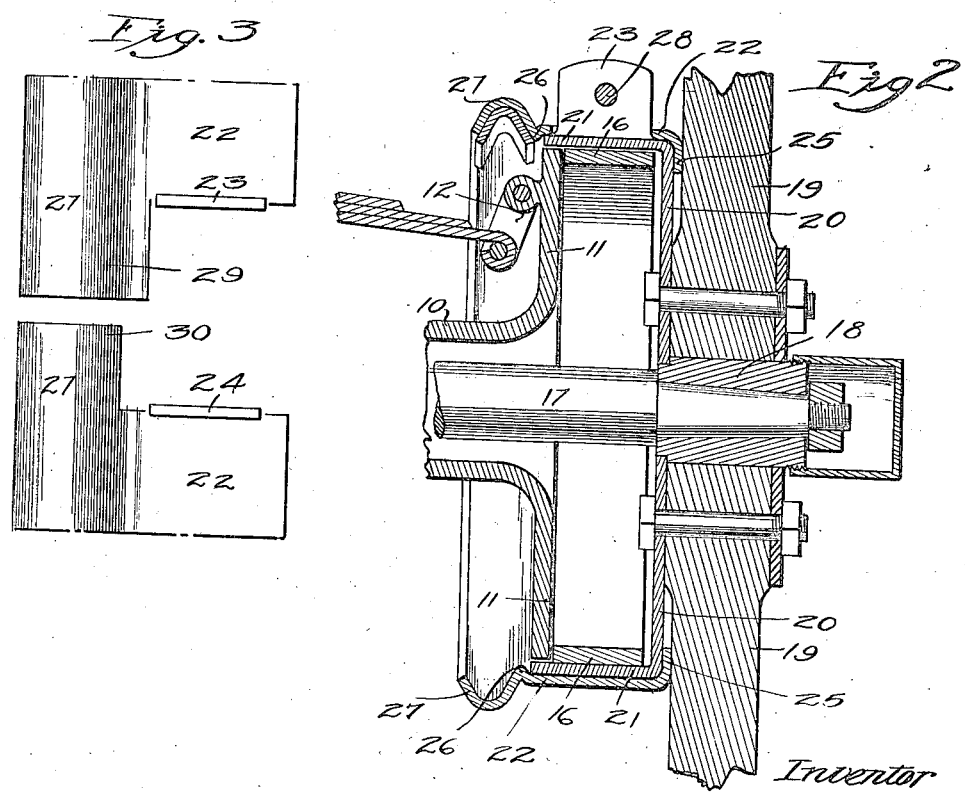

1,473,664

UNITED STATES PATENT OFFICE.

WARD D. BEIGHTOL, OF FORT DODGE, IOWA.

GREASE SHIELD FOR BRAKE DRUMS.

Application filed September 11, 1922. Serial No. 587,341.

*To all whom it may concern:*

Be it known that I, WARD D. BEIGHTOL, a citizen of the United States, and a resident of Fort Dodge, in the county of Webster and State of Iowa, have invented a certain new and useful Grease Shield for Brake Drums, of which the following is a specification.

My invention relates to a protective device for use in connection with the brake drums on the rear wheels of the automobile and has as its object, to prevent the throwing of grease which has escaped from the interior of the brake drum against the tires and under portions of an automobile in the vicinity of the rear wheels.

More explicitly, it is my object to provide such a protective device wherein the grease will be caught in a ring-shaped trough, surrounding the brake drum, and will be held in the trough by the centrifugal force caused by the rotation of the wheels.

A still further object is the designing of such a protective device in such a form that it may be readily attached or detached from the brake drum and securely held in place when attached.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view of a portion of the rear axle housing of an automobile and a wheel mounted thereon with my grease shield attached thereto.

Figure 2 is a vertical, central section through the same.

Figure 3 is a plan view of the two ends, slightly separated, of the grease shield.

It is a well known fact that oils and greases, when they come in contact with rubber, have a tendency to rot and to deteriorate the same. The ordinary brake drum of an automobile is filled with grease or heavy oil which is used for lubricating the differential, the axle bearings and other parts within the rear axle housing.

Ordinarily, there is a sufficient space between the brake drum and the axle housing where the two come together, that the grease will gradually work out until it forms a slight ring on the exterior of the brake drum and the axle housing. That which clings to the brake drum will gradually be thrown outwardly by the centrifugal force of the revolving drum and the greater part of it will be thrown against the tire. Much of it will also be thrown against the under side of the fenders and other parts of the car, where it will form a coating which collects dirt and renders the underneath portion of a car very dirty.

In order to remedy this condition, I have provided my grease shield, which I will now describe in connection with the parts of an automobile to which it is attached.

I have used the reference numeral 10 to indicate the tubular portion of a rear axle housing. The housing 10 is flared out at its outer end to form the annular flange 11.

Mounted on the flange 11 is the stirrup 12, which supports the spring 13. The radius rod 14 is connected to the flange 11, and the brake rod 15 operates a lever 16 mounted in the flange 11 and designed to expand the brake shoe 16ª which is also mounted on the flange 11 on the other side.

The axle 17 extends through the housing 10 and has mounted on its outer end, the wheel 18. The wheel 18 has the spokes 19 and the brake drum 20 spaced slightly away from the spokes 19.

The brake drum 20 has the annular flange 21, which encloses the brake shoe 16 and extends over the edge of the flange 11.

My grease shield comprises an annular band 22 in the form of a split ring and having its ends bent outwardly at right angles to the band to form the ears 23 and 24.

On one edge of the band 22 is an inwardly extending flange 25. The other edge of the band 22 is bent slightly inwardly (as at 26) and then bent outwardly and inwardly to form a trough 27. The flange 25 is designed to slip down into the space between the drum 20 and spokes 19 and the beaded portion 26 is designed to engage the edge of the brake drum. The band 22 and its flanges form an exterior chamber for the brake drum.

It will be seen that when the band 22 is placed around the brake drum and the ends drawn together, that the portions 25 and 26 will hold it securely in place.

A bolt 28 is inserted through openings in the ears 23 and 24, and serves to draw the ends of the band 22 together and hold the band in place. On the end of the band 22, having the ear 23, the trough 27 is extended beyond the ear 23, as at 29.

On the other end of the band 22 the trough 27 is extended beyond the ear 24, as at 30, and made smaller in cross section so as to conform with the under side of the portion 29.

The portion 30 is designed to slide within the portion 29 when the ears 23 and 24 are drawn together so as to provide a continuous trough.

In the practical operation of my device, it may be sprung apart at its ends in order to install it in place, and the bolt 28 inserted for locking it on the brake drum when the car is in motion, any grease which may escape between the flange 11 and the brake drum 21, will be caught in the trough 27, and will flow to the outermost portion of the trough by the action of the centrifugal force produced by rotation.

When the car stops, the grease will flow around the interior of the ring until it reaches the bottom thereof, and if there is a large amount of grease it will then flow to the bottom and be deposited upon the ground, without doing injury to the car.

It will be seen that I have provided a very simple and inexpensive device which will effectively shield the parts of the car from flying grease and which may be readily installed or taken off.

Some changes may be made in the construction and arrangement of the various parts of my invention, without departing from the real spirit and purpose of my invention, and it is my intention to cover by my claims, any modified forms of structure which may be reasonably included within their scope.

I claim as my invention:

1. In a device of the class described, an annular band adapted to fit the exterior of the rim of a brake drum, said band having inwardly extending annular members at either edge for forming an exterior chamber for the brake drum, an annular trough formed on one edge thereof, and designed to catch particles of grease expelled from the interior of the drum, said band and trough being in the form of a split ring, and means for connecting the ends of the band together for securing it in place upon the brake drum.

2. In a device of the class described, an annular band adapted to fit the exterior of the rim of a brake drum, said band having inwardly extending annular members at either edge for forming an exterior chamber for the brake drum, an annular trough formed on one edge thereof, and designed to catch particles of grease expelled from the interior of the drum, said band and trough being in the form of a split ring, ears on the ends of the band having openings therein, and a bolt designed to extend through said opening for drawing the ends of the band together.

3. A grease shield for brake drums comprising a trough, said trough being in the form of a ring, the vertex of the trough being at the outside of the ring, a lateral annular flange on said trough, for securing it to a brake drum, said trough forming an exterior chamber for the brake drum, said flange and said trough being severed transversely for forming open ends, ears on the ends of the flange and a bolt adapted to hold the ends of the flange together, said bolt being passed through openings in the ears.

4. A grease shield for brake drums including a trough in the form of a ring, the vertex of the trough being at the outside of the ring, a laterally extending annular flange on said trough designed to engage the outer surface of the rim of a brake drum, said trough forming an exterior chamber for the brake drum, and inwardly extending annular portions on the outer edge of said flange and on the portion of said flange which is joined with the annular trough, said inwardly extending portions being designed to engage the edges of the brake drum for holding the shield securely in place.

5. A grease shield for use in connection with automobile brake drums comprising a trough in the form of a ring and a laterally extending flange on said trough for engaging the rim of the brake drums, said trough forming an exterior chamber for the brake drum.

Des Moines, Iowa, August 18, 1922,

WARD D. BEIGHTOL.